(12) United States Patent
Larsen

(10) Patent No.: US 6,917,294 B2
(45) Date of Patent: Jul. 12, 2005

(54) ELECTRONICALLY MONITORED FISH FARM NET AND METHOD

(76) Inventor: Leif Eirik Larsen, Klubbensset 7, Florø (NO), N-6900

( * ) Notice: Subject to any disclaimer, the term of this patent is extended or adjusted under 35 U.S.C. 154(b) by 11 days.

(21) Appl. No.: 10/481,069
(22) PCT Filed: Jul. 1, 2002
(86) PCT No.: PCT/NO02/00241
§ 371 (c)(1),
(2), (4) Date: Dec. 17, 2003
(87) PCT Pub. No.: WO03/003823
PCT Pub. Date: Jan. 16, 2003

(65) Prior Publication Data
US 2004/0174266 A1 Sep. 9, 2004

Related U.S. Application Data
(60) Provisional application No. 60/303,066, filed on Jul. 6, 2001.

(51) Int. Cl.[7] .............................................. G08B 23/00
(52) U.S. Cl. ......................... 340/573.2; 119/220; 43/7
(58) Field of Search ............................. 340/550, 573.2, 340/652, 663, 664, 675; 119/220; 43/7

(56) References Cited
U.S. PATENT DOCUMENTS

| 4,676,485 A | | 6/1987 | Ciordinik | |
|---|---|---|---|---|
| 4,688,024 A | | 8/1987 | Gadde | |
| 4,744,331 A | * | 5/1988 | Whiffin | 119/223 |
| 4,791,410 A | | 12/1988 | Larsson | |
| 4,825,810 A | * | 5/1989 | Sharber | 119/220 |
| 5,036,166 A | | 7/1991 | Monopoli | |
| 5,049,854 A | | 9/1991 | Wolf | |
| 5,448,968 A | * | 9/1995 | Ostlie | 119/220 |

FOREIGN PATENT DOCUMENTS

| GB | 2 031 251 | 4/1980 |
|---|---|---|
| JP | 1-312948 | 12/1989 |
| JP | 2-171129 | 7/1990 |
| NO | 161593 | 9/1988 |

* cited by examiner

Primary Examiner—Jeffery Hofsass
Assistant Examiner—George A Bugg
(74) Attorney, Agent, or Firm—Onsagers AS; Christian D. Abel

(57) ABSTRACT

A fish farming net having conductive wires integrated into the filaments of the net. The conductive wires are arranged in circuits, each of said circuits defining a field connected to an electronic apparatus that monitors a certain electrical parameter of the field. The wires of each circuit are arranged in a pattern whereby the wires are close enough together that a hole large enough for fish to escape will necessarily break one of the wires. In the event the circuit is broken, the monitoring apparatus detects a change in the electrical parameter being monitored and signals an appropriate alarm.

15 Claims, 6 Drawing Sheets

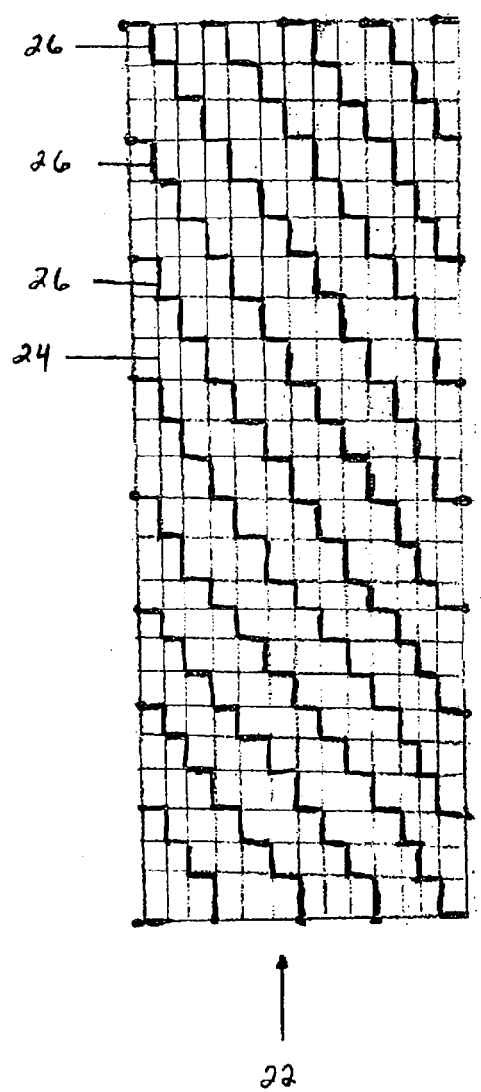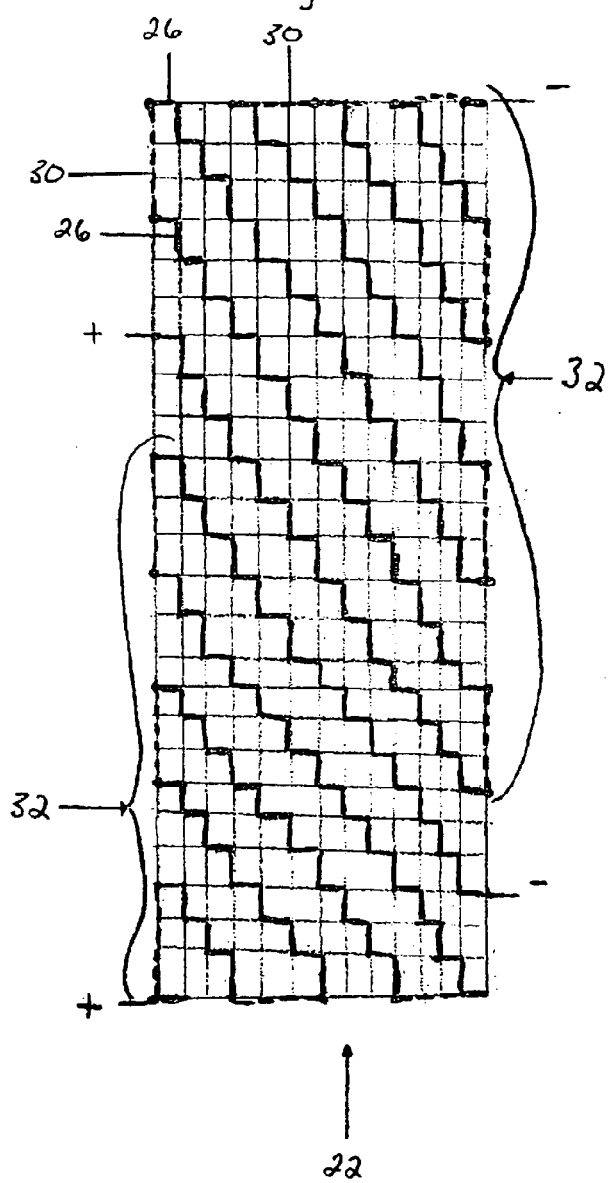

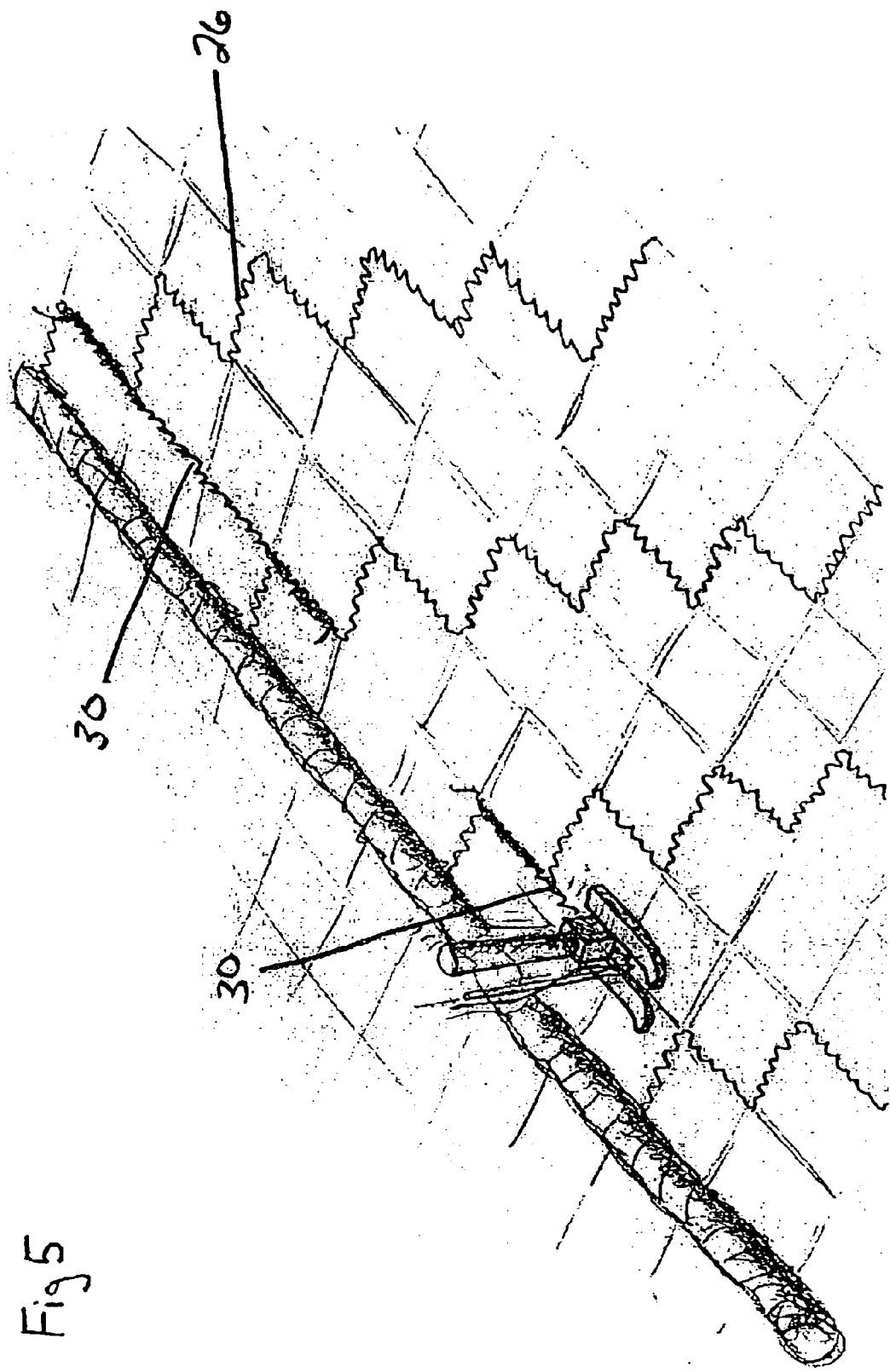

ELECTRONICALLY MONITORED FISH FARM NET AND METHOD

This application is a national stage application of PCT Application No. PCT/NO02/00241, which was filed on Jul. 1, 2002, and claims priority to U.S. Provisional Application No. 60/303,066, filed on Jul. 6, 2001.

TECHNICAL FIELD

The present invention relates to nets used in fish farming facilities, more particularly to holding nets having electronic means for detecting and localizing holes or tears in said nets.

BACKGROUND

A fish farming facility typically comprises large holding nets for containing fish. A common problem with such facilities is that holes or tears occasionally occur in the nets. If such holes or tears are not detected, large numbers of fish can escape. This is both an economic problem for the operator as well as an environmental problem. Escaped fish compete with wild species; often to such a degree that the wild species become endangered and in the worst can become eradicated.

There is presently no effective method for immediately detecting and localizing such holes or tears. There is therefore a need for a system that immediately detects the precise location of such holes or tears, and signals an alarm.

SUMMARY OF THE INVENTION

The present invention comprises a fish farming net having conductive wires integrated into the filaments of the net. The conductive wires are arranged in circuits, each of said circuits defining a field connected to an electronic apparatus that monitors a certain electrical parameter of the field. The wires of each circuit are arranged in a pattern whereby the wires are close enough together that a hole large enough for fish to escape will necessarily break one of the wires. In the event the circuit is broken, the monitoring apparatus detects a change in the electrical parameter being monitored and signals an appropriate alarm. Holes or tears can thus immediately be detected and localized to a particular field.

A method is also described for forming nets having a plurality of integrated, conducive wires connected to one another so as to create a continuous conductor of predefined length and configuration.

BRIEF DESCRIPTION OF THE DRAWINGS

The invention will be described in detail with reference to the following figures, wherein:

FIG. 3 is a schematic view of a section of net, showing the diagonal weaving pattern, with conductive filaments represented by bold lines.

FIG. 4 is a detailed view showing the connection between individual conductive filaments of a net-section in order to form a continuous conductor.

FIG. 5 is a perspective view showing a splice being made between conductive filaments by sewing.

DETAILED DESCRIPTION

Figure 1:
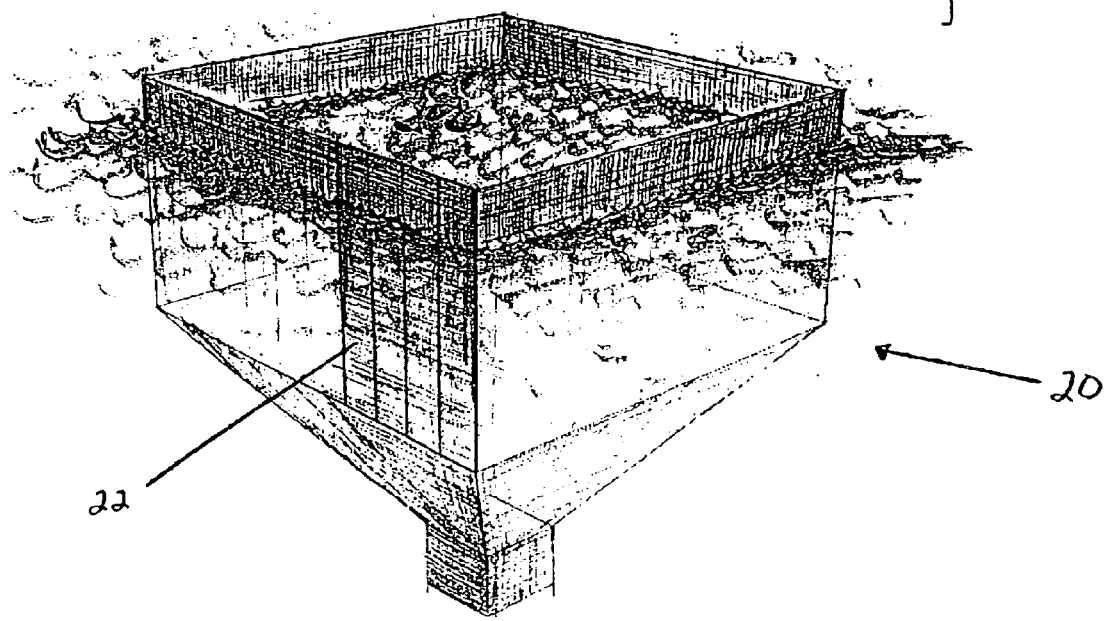
FIG. 1 is a perspective view of a holding net of a fish farming facility.

FIG. 1 depicts a typical holding net 20 of a fish farming facility. A holding net of this type is constructed of a plurality of net sections 22 joined together. Holding nets may also be conical in shape. Nets of this type are constructed of several triangular nets sections joined together to form an inverted cone.

Figure 2:
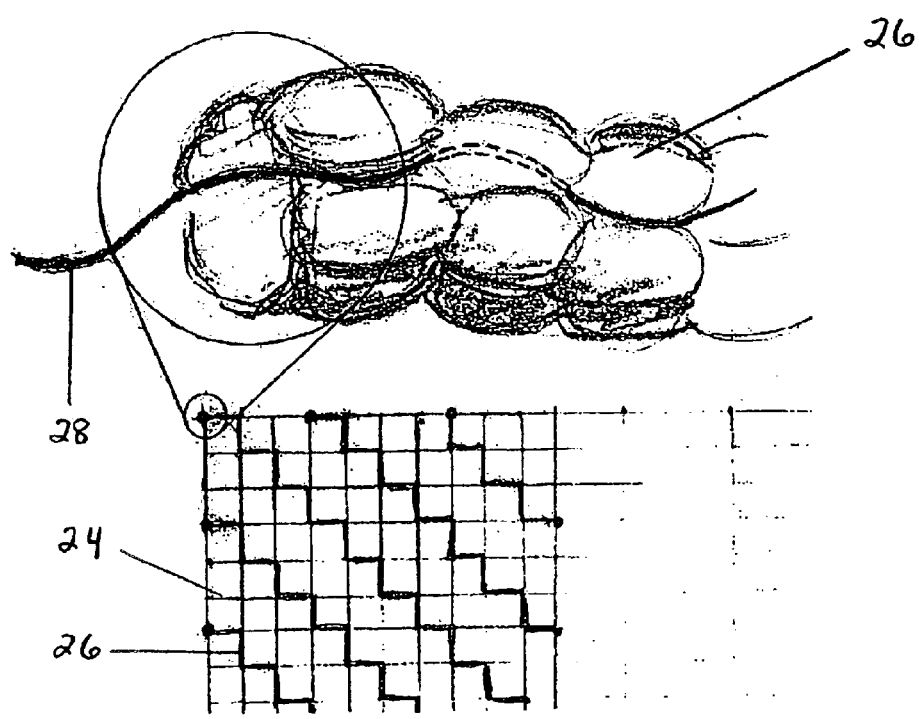
FIG. 2 is a detailed view of a conductive wire integrated into a nylon filament to form a conductive filament.

Net sections 22 are manufactured by weaving machines. While nets manufactured by weaving machines appear to have a grid-like mesh configuration, the net is actually composed of nylon filaments 24 that traverse the net in a diagonal fashion, as can be discerned from FIG. 2.

According to the present invention, a predetermined number of nylon filaments 24 are replaced by conductive filaments 26. According to a preferred embodiment, conductive filaments 26 comprise an acid-resistant, steel fibre thread or other appropriate conductor 28 spun into an otherwise ordinary nylon filament 24 under the filament-production process. Conductor 28 may or may not be coated, with Teflon® for example, according to the requirements of the spinning process. With nets having a mesh size of approximately 25 mm, it is preferred that every third filament 24 be replaced by a conductive filament 26.

As a part of the manufacturing process, net sections 22 are cut from bulk net material, resulting in a several individual, diagonal lengths of conductive filament 26, as shown in FIG. 3. In the case of a conical net will these sections of course be triangular in shape. According to the invention, these separate lengths of conductive filament 26 are connected in series to one another by splices 30 (shown as dashed lines) in order to form a continuous conductor having a specific pattern, such as that shown in FIG. 4. According to the preferred embodiment, each net section 22 comprises a plurality of said continuous conductors, each of which defines a field 32.

According to a preferred embodiment of the invention, splices 30 are formed by sewing lengths of conductor 28 into intermediate segments of nylon filaments 24, as shown in FIG. 5. Other appropriate means for forming a conductive connection between the individual lengths of conductive filaments 26 could also be employed.

As shown in FIGS. 6, 7, 8 and 9, net sections 22 (with fields shown here as 32', 32", 32'" etc) are connected to a power source 34 and a system for monitoring a specific electrical parameter of the fields.

Figure 6:
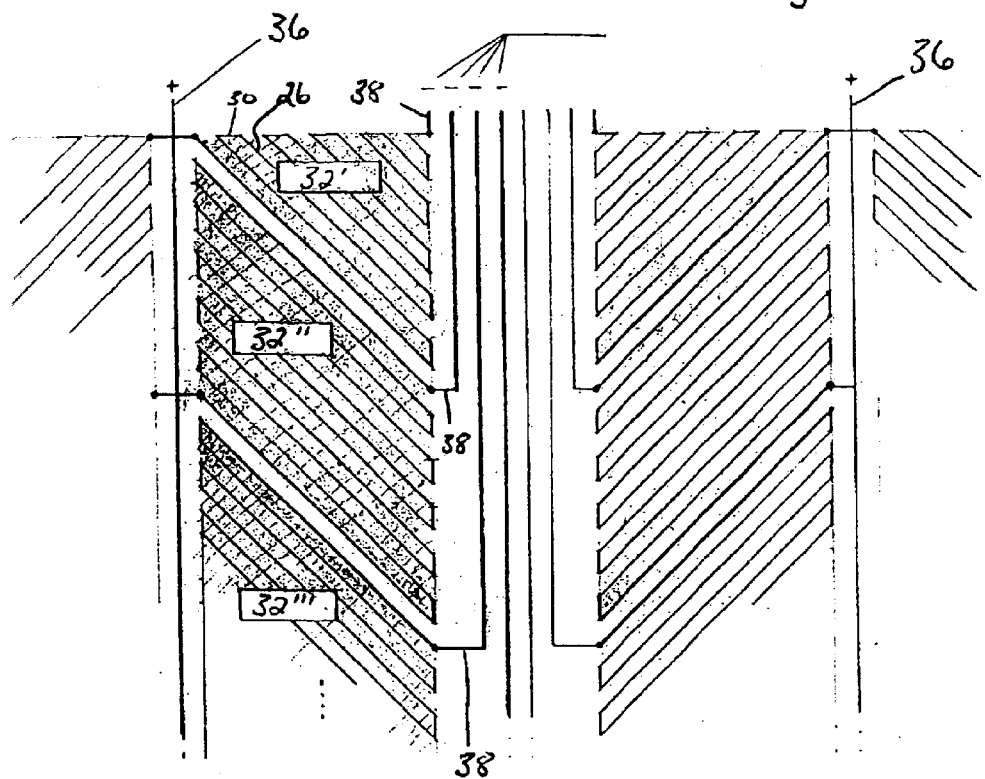
FIG. 6. is a schematic view of a plurality of net sections, each of which contains fields connected to positive and negative leaders.
Figure 7:
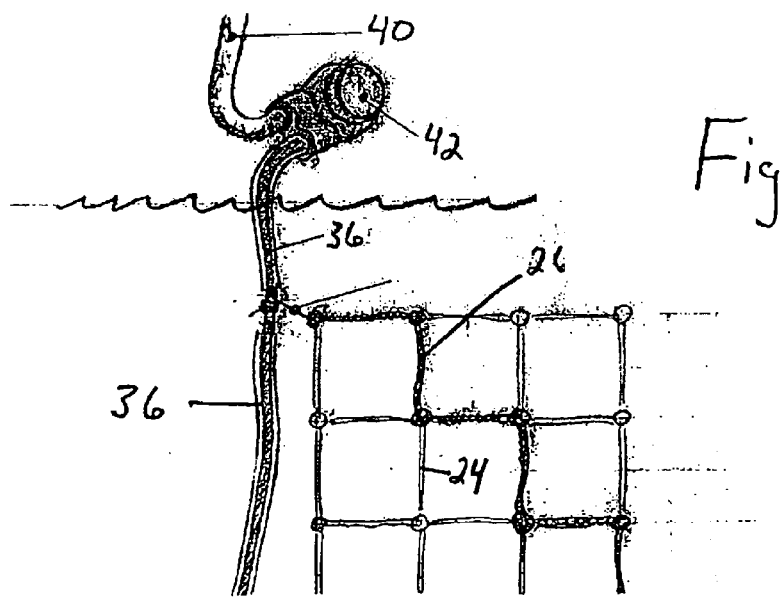
FIG. 7 is a detailed view showing the connection between one end of the continuous conductor formed in a net section and a leader.

As shown in FIG. 6 and 7, an insulated, common positive leader 36 connects the fields of adjacent pairs of net sections 22 to the positive terminal of power source 34. A separate, insulated negative leader 38 connects each individual field to the negative terminal of power source 34. Leaders 36 and 38 are preferably made from the same material as conductor 28 to avoid an electrochemical reaction under seawater. Above the surface, the leaders may be connected to a copper conductor 40 by a sealed coupling 42 as shown in FIG. 7.

Figure 8:
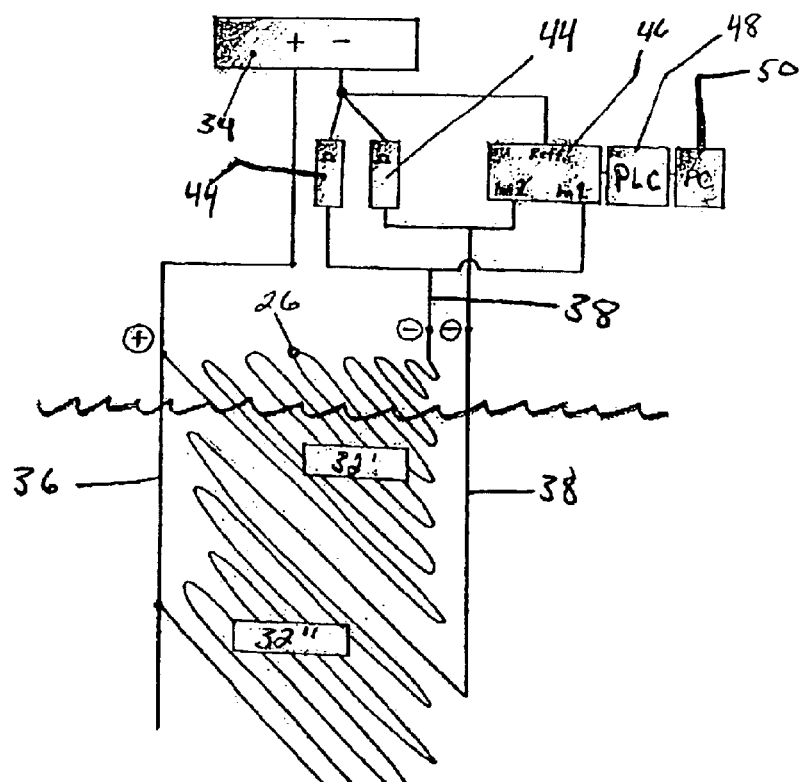
FIG. 8 is a schematic view of fields connected to a voltage source and monitoring apparatus.

In the preferred embodiment, the electrical parameter that is monitored is the resistance of the fields. FIG. 8 is a schematic representation of one example of a monitoring arrangement. Power source 34 places a voltage across each field 32. The voltage value is preferably low enough that the fish are not adversely affected. Experiments have shown that the voltage should be lower than 30V. Each field 32 is connected in series to a reference resistor 44. A small-scale test used resistors of 100Ω. In this example, an analogue in/out module 46 was connected across reference resistors 44. A programmable logic controller 48 measures the voltage across the resistors and the system is preferably controlled by a computer 50.

The monitoring system measures the voltage across the fields at regular intervals, in this example every five seconds, and compares the value with the previous value. If the difference is greater than, for example 20%, an alarm is triggered. This detects a sudden break in one of the conductive filaments 26. In addition, the monitoring system registers whether the measured voltage lies within predefined minimum and maximum values. These values take into account natural variations in voltage due to temperature, salinity etc. This allows for detection of breaks that occur gradually over time. All measured values are logged at regular intervals.

Figure 9:
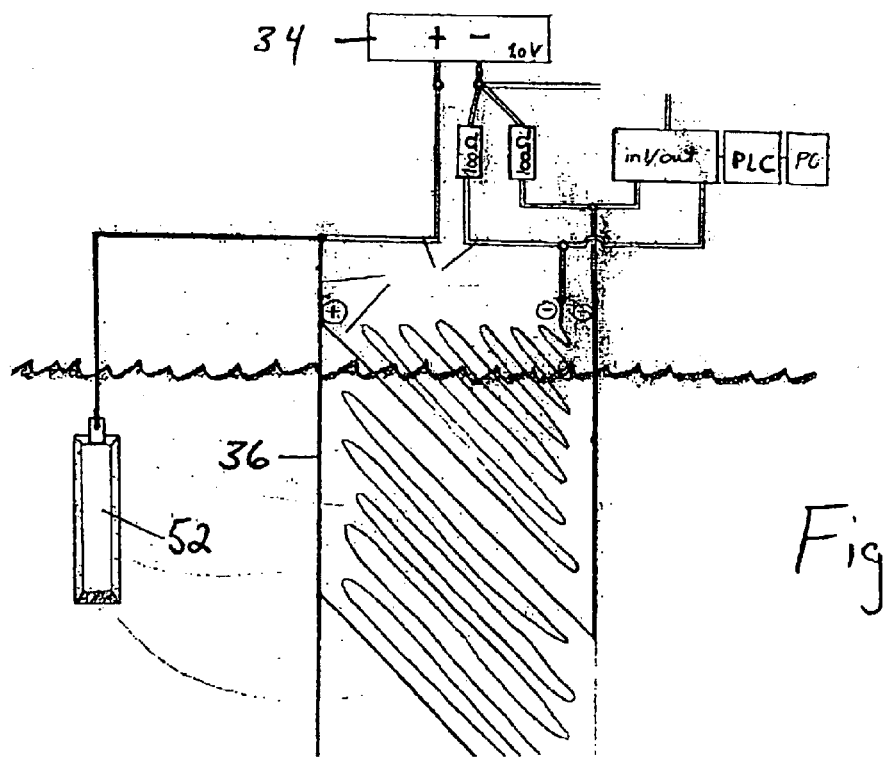
FIG. 9 is a schematic view of a corrosion-protection arrangement.
Figure 10:
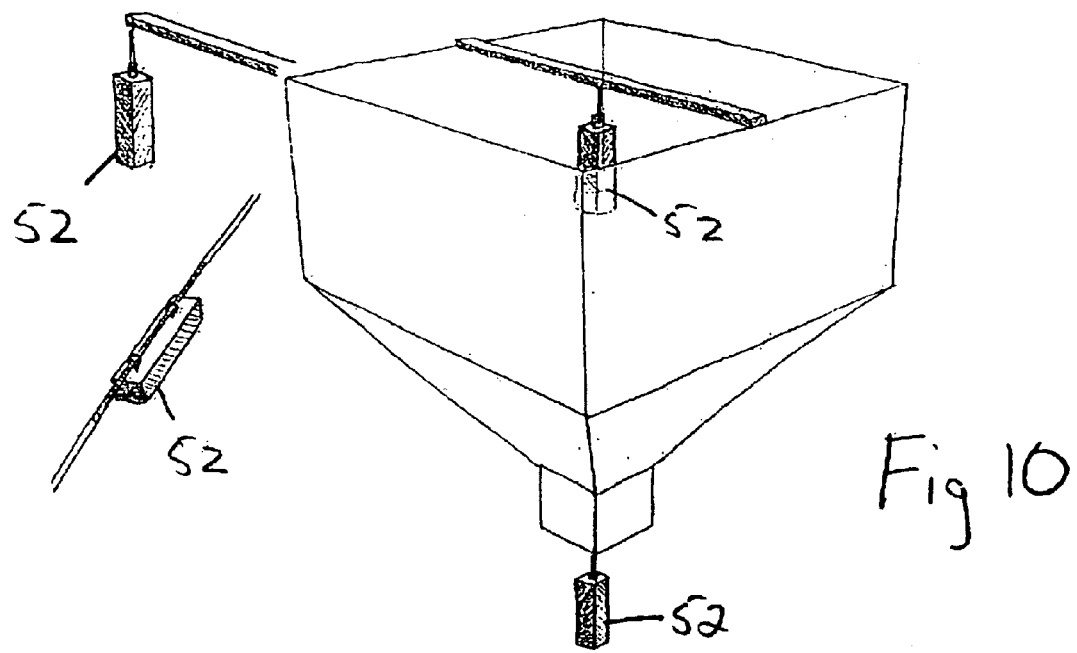
FIG. 10 is a perspective view showing alternative placements for the anode of the corrosion-protection arrangement.

Conductors located in seawater are subject to pitting and corrosion over time. The present invention therefore includes a sacrificial anode 52 connected to the positive terminal, as shown in FIG. 9. FIG. 10 illustrates alternative placements for anode 52. Other conductive constructions, such as railings and steel walkways, should also be connected to an anode to prevent interference with distribution of current to the system.

An additional benefit of the above-described system is that the electrical field generated by the conducting filaments prevents/reduces marine growth from accumulating on the nets.

What is claimed is:

1. A holding net useful in a fish farming facility, comprising a plurality of net-sections joined together to create an enclosure for containing fish, said net-sections being made of netting material manufactured from a plurality of filaments woven together, characterized in that:

a plurality of electrically-conductive filaments is woven into the netting material close enough together such that a tear in a net section large enough to permit the escape of fish would necessarily involve the breaking of one or more of said conductive filaments;

the conductive filaments within a particular net section are connected together in order to form one or more electrical fields within each net section;

each of said electrical fields is connected to an electrical power supply and a monitoring device capable of detecting a change in one or more electrical parameters in the electrical field in the event a conductive filament is broken; and an alarm connected to said monitoring device that signals a warning in the event of a change of an electrical parameter outside of a predetermined range of values.

2. Net according to claim 1, characterized in that said conductive filaments are woven into the netting material by substituting a conductive filament for a regular filament at regular intervals, and that said electrical fields within said net sections are created by connecting alternating ends of said conductive filaments together to form a continuous conductor that traverses the net section back and forth in a regular pattern having a predetermined shape and size.

3. Net according to claim 2, characterized in that the alternating ends of the connective filaments are connected to each other by sewing an electrical conductor into the intermediate regular filament of the netting material.

4. Net according to claim 3, characterized in that a common electrical leader, connected to the positive terminal of the power supply, is affixed between adjacent net sections of the holding net and that one end of the continuous conductors are connected to said common leader, and the other end of said continuous conductors is connected to the negative terminal of the power supply.

5. Net according to claim 4, characterized in that a sacrificial anode is connected to the electrical fields in order to prevent corrosion of the conductive filaments.

6. Net according to claim 5, characterized in that resistance is the electrical parameter that is monitored.

7. Net according to claim 6, characterized in that the monitoring device measures the voltage across the electrical fields at regular intervals, and compares the current value with the previous value, and that the alarm is triggered in the event that the difference in voltage between consecutive measurements is greater than a predetermined value.

8. Net according to claim 6, characterized in that monitoring device measures the voltage across the electrical fields at regular intervals and that the alarm is triggered in the event the measured voltage is outside of a predetermined range.

9. Net according to claim 7 or 8, characterized in that the voltage applied to the electrical fields is low enough so as not to adversely affect the fish in the holding net.

10. Net according to claim 7 or 8, characterized in that the voltage applied to the electrical fields is less than 30V.

11. A method for monitoring a fish farming holding net in order to detect and prevent the escape of fish, said net being comprised of a plurality of net-sections joined together to create an enclosure for containing fish, said net-sections being made from bulk netting material comprised of woven filaments, characterized by the steps of:

manufacturing said netting material by substituting an electrically conductive filament for the regular filaments at regular intervals in the weaving process, said interval being chosen so as to space the conductive filaments close enough together that a tear large enough to permit the escape of fish would necessarily involve the break of one or more conductive filaments;

cutting the net sections from the bulk netting material, thus creating exposed filament ends along the edges of the net sections;

electrically connecting alternating ends of the conductive filaments together in order to create one or more continuous conductors that traverse back and forth across the net section to define one or more fields, each continuous conductor having a first and a second end;

connecting the first end of each continuous conductor to the positive terminal of a power supply, connecting the second end of each continuous conductor to the negative terminal of a power supply, monitoring one or more electrical parameters across the continuous conductors, supplying an alarm that is triggered in the event the electrical parameter being monitored changes by a predetermined value, such that any tear in a net section large enough to permit fish to escape will necessarily break a conductive filament, thus causing a change in the electrical parameter being monitored and triggering the alarm.

12. Method according to claim 11, characterized in that the alternating ends of the conductive filaments are connected by sewing a conductor into the intermediate, regular filament.

13. Method according to claim 12, characterized in that the conductive filaments are coated with Teflon® or other appropriate coating.

14. Method according to claim 13, characterized in that a sacrificial anode in connected to the continuous conductor in order to prevent corrosion in sea water.

15. Method according to claim 14, characterized in that resistance is the electrical parameter that is monitored.

* * * * *